Oct. 5, 1971   R. H. TELFER ET AL   3,609,841

METHOD OF MAKING BLADE RING ASSEMBLIES

Filed Aug. 1, 1968

3,609,841
METHOD OF MAKING BLADE RING ASSEMBLIES

Robert Hunter Telfer, George Wilson Wall, and Michael John Fletcher, Whetstone, England, assignors to The English Electric Company Limited, London, England
Filed Aug. 1, 1968, Ser. No. 749,476
Claims priority, application Great Britain, Aug. 2, 1967, 35,500/67
Int. Cl. B21k 3/04; B23p 15/02, 15/04
U.S. Cl. 29—156.8 R
9 Claims

ABSTRACT OF THE DISCLOSURE

A method of manufacturing a blade ring assembly is disclosed in which the blade roots and the circumferential groove in the disc, rotor or like support member for the blades are of simple section.

In accordance with the disclosure, a circumferential groove having plane walls is formed in the support member and two opposed plane faces are formed on each blade root such that the latter is a close fit within the groove walls and holds its blade at the required setting angle. The blades of the ring are fitted into the groove with the required pitch between them and an electron beam is directed radially towards each joint between the groove and blade roots whereby to fuse said joint, the energy of the beam being selected to penetrate over the depth of the joint. Relative rotation is then provided between the beam and the support member to complete said fusing around the circumference of the latter.

---

This invention relates to blade ring assemblies and to methods of forming such assemblies.

The invention has particular, though not exclusive, application to rotor assemblies for industrial steam turbines. In such steam turbines the rotor blade rings are usually attached to the rotor via blade roots which are of T-shaped or fir-tree shaped section, these roots being located in correspondingly shaped grooves provided on the rotor. Such roots and grooves require extremely accurate machining and are therefore difficult and costly to produce. Furthermore, with such roots and grooves, the rotor speed is somewhat limited, since as the designed speed of the rotor is increased, the necessary additional strength of the roots is achieved at the cost of additional weight of the roots which beyond a certain speed nullifies or partially nullifies the additional strength.

One object of the present invention is to provide a rotor blade assembly which at least partly overcomes the above-mentioned disadvantages.

According to the present invention, a method of forming a blade ring assembly comprises, forming a circumferential groove having plane walls in a disc, rotor, or the like for the blades, forming two opposed plane faces on each blade root at an angle with respect to the blade equivalent to the setting angle required of the blade and with a dimension between the faces such that the latter are a close fit within the groove walls, arranging and holding the blades to form a ring, fitting the ring of blades into the groove with the required pitch between individual blades of the ring, directing a high energy beam radially towards each joint between the groove and blade roots whereby to fuse said joint, the energy of said beam being selected so as to penetrate substantially over the depth of the joint, and providing relative rotation between said beam and said rotor, disc or the like whereby to complete said fusing around its circumference.

Preferably, the blade roots are formed with two further opposed faces with a dimension between the faces selected to provide the required pitch between the blades of the ring when fitted into the groove. This may be achieved by abutment of said further opposed faces of adjacent blades of the ring, or alternatively the dimension selected may allow for a predetermined gap between said adjacent blades.

Fusing of the joints may be carried out in a vacuum chamber, said rotor, disc or the like being rotatably mounted within said vacuum chamber.

Conveniently a single high energy beam is used and is directed against each joint in turn, in which case each beam directing operation is accompanied by a said relative rotation operation to achieve fusing.

The walls of the groove may be perpendicular to the axis of the disc, rotor or the like, in which case said opposed faces of the blade roots are parallel over their depth, and the bottom of the groove walls may be recessed so as to accommodate loose wires which extend beneath each joint for absorbing any surplus energy from the high energy beam.

Alternatively, the groove walls may slope towards each other, and have a central groove extension at the bottom of the groove, in which case the blade roots are similarly shaped and any surplus energy from the high energy beam is absorbed in those parts of the blade roots fitting within said groove extension.

The high energy beam may be provided by an electron beam welding gun.

In order that the invention may be readily understood, one embodiment thereof as applied to a steam turbine rotor blade ring, will now be described by way of example, with reference to the accompanying drawing, in which.

Figure 1:
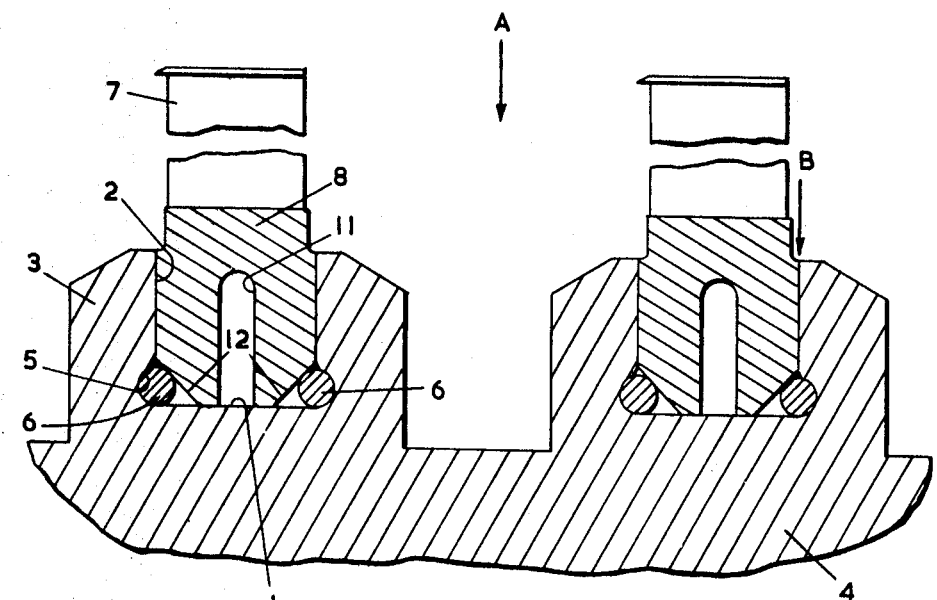
FIG. 1 is a fragmentary sectional view of turbine blades assembled in a disc-type rotor.
Figure 2:
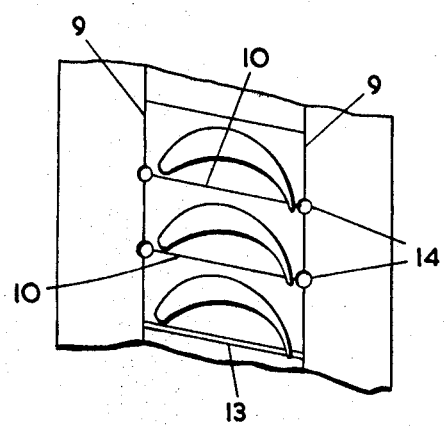
FIG. 2 is a view in the direction of arrow A, FIG. 1.

Referring to FIGS. 1 and 2 of the drawing, a circumferential groove 1 having plane walls 2 is machined in each blade ring disc 3 of the rotor 4 to a required depth. A semi-circular recess 5 is then machined in each wall 2 adjacent the bottom of the groove 1, and loose wires 6 are located in these recesses. Each disc 3 of the rotor 4 is now ready to receive its ring of turbine blades 7.

The turbine blades 7 are conveniently pre-formed with oversize blade roots 8 having two pairs of opposed faces 9 and 10, and a central slot 11. Prior to assembling the ring of blades into the groove 1, the two opposed faces 9 of each blade root are machined to an angle with respect to its blade 7 equivalent to the setting angle required of the blade, and to a dimension between the faces providing a close fit within the groove walls 2, and the bottom edges of the faces 9 are chamfered as shown by reference 12, FIG. 1. The other two opposed faces 10 of each blade root 8 are also machined to a dimension between the faces selected to provide the required pitch between the blades 7 by abutment of said faces 10 of adjacent blades, when the ring of blades have been fitted into their circumferential groove 1. Alternatively, the dimension may be selected to allow for a predetermined gap 13, see FIG. 2, between the faces 10. The gap, if required, would be of the order of .0015 inch and would be provided during assembly using feeler gauges. The machining operations on the faces 9 and 10 are conveniently carried out using the slot 11 as a reference. The required number of blades are now tapped into each circumferential groove 1 to form the blade rings, the chamfers 12 of the individual blades providing a clearance between the blade roots 8 and the loose wires 6 located in said grooves. The faces 9 are now fused to the walls 2 of the groove 1. Fusing is conveniently achieved in this embodiment using an electron beam welding machine. Such machines generally comprise a vacuum chamber, with an electron gun adjustably mounted externally of the chamber for directing an electron beam into said chamber. Thus, the assembled rotor is rotatably mounted in the chamber and connected to suitable drive means, and the electron beam is directed in turn onto each joint between the groove wall 2 and faces 9 of the blade roots by suitable location of the rotor in the vacuum chamber, and by suitable adjustment of the electron gun, the beam is aligned with the depth of the joint, i.e. in the direction shown by arrow B, FIG. 1. The current and voltages applied to the gun are then adjusted so as to provide sufficient energy in the beam to penetrate the depth of the joint. The mating surfaces of the joint will thus be fused together over their depth, and any surplus energy in the electron beam will be absorbed by the loose wires 6. The rotor is then rotated through at least 360° after each beam directing step so that the beam may traverse around the circumference of each joint, and thus complete the fusing of said joints.

It will be appreciated that the slots 11 are provided in the blade roots 8 to give resilience to the latter so as to prevent cracking during fusing, and the gaps 13 may be left between the blade roots to cater for any distortions which might take place during fusing. For highly stressed applications it may be necessary to provide radially extending relieving holes 14 as shown in FIG. 2.

Figure 3:
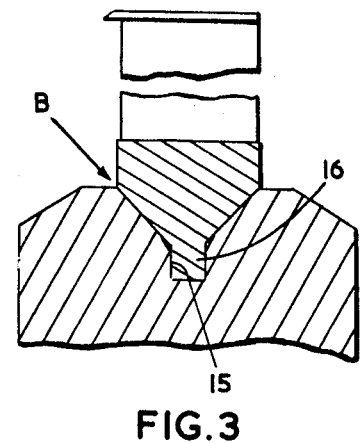
FIG. 3 is a fragmentary sectional view of a modified form of blade root assembled in a disc-type rotor.

Referring now to FIG. 3, a modified form of blade root 8 and groove 1 is shown in which the groove walls 2 slope towards each other and the bottom of the groove has a central groove extension 15. The blade roots 8 of the blades 7 are similarly shaped and hence to achieve fusing, the electron beam is directed against each joint in the direction of arrow B, and any surplus energy in the beam is absorbed by that part 16 of each blade root fitting into the groove extension 15. This eliminates the loose wires 6 in the FIG. 1 arrangement.

Although the embodiments of the invention have been described as applied to a disc-type rotor, it will be appreciated that the invention may also be readily applied to drum-type rotors. Furthermore, the invention is not limited to rotor blade assemblies, but could conveniently be used, for example, in stator blade assemblies.

It will also be appreciated that any suitable high energy beam may be used to achieve fusing of the joints, for example, a laser beam.

It will be further appreciated that, particularly with regard to the FIG. 1 arrangement, ultrasonic inspection of the electron beam welds may be readily carried out.

We claim:

1. A method of forming a blade ring assembly, wherein the improvement comprises, forming a circumferential groove in the blade supporting member, forming two opposed plane faces on each blade root at an angle with respect to the blade equivalent to the setting angle required of the blade and with a dimension between the faces such that the latter are a close fit within the groove walls, arranging and holding the blades to form a ring, fitting the ring of blades into the groove with the required pitch between individual blades of the ring, directing a high energy beam radially towards each joint between the groove and blade roots whereby to fuse said joint, the energy of said beam being selected so as to penetrate substantially over the depth of the joint, and providing relative rotation between said beam and said blade supporting member whereby to complete said fusing around its circumference, two further opposed faces being formed on each blade root with a dimension between the faces selected to provide the required pitch between the blades of the ring when fitted into the groove.

2. A method according to claim 1 wherein fusing of said joints is carried out in a vacuum chamber, said blade supporting member being rotatably mounted within said vacuum chamber.

3. A method according to claim 2 wherein a single high energy beam is used and is directed against each joint in turn, each beam directing operation being accompanied by a said relative rotation operation to achieve fusing.

4. A method according to claim 3 wherein the high energy beam is provided by an electron beam welding gun.

5. A method according to claim 1 wherein the ring of blades is fitted into the groove with the said further opposed faces of adjacent blades in abutment, the dimension between the said further opposed faces of each blade being chosen accordingly.

6. A method according to claim 1 wherein the ring of blades is fitted into the groove with a predetermined gap between the said further opposed faces of adjacent blades, the dimension between the said further opposed faces of each blade being chosen accordingly to allow for said gap.

7. A method according to claim 1 wherein the circumferential groove is formed with its walls perpendicular to the axis of the blade supporting member, and said opposed faces of the blade roots are formed such that they are parallel over their depth.

8. A method according to claim 7 including the step of forming a recess at the bottom of each groove wall, and arranging a loose wire in each recess so that it extends circumferentially around said blade supporting member beneath each joint for absorbing any surplus energy from the high energy beam.

9. A method according to claim 1 wherein the circumferential groove is formed with its walls sloping towards each other and with a central groove extension at the bottom of the groove, and said opposed faces are shaped to fit within said sloping walls and said groove extension, those parts of the blade roots fitting within said groove extension absorbing any surplus energy from the high energy beam.

References Cited

UNITED STATES PATENTS

| | | | |
|---|---|---|---|
| 1,513,824 | 11/1924 | Kasley | 29—424 |
| 2,221,672 | 11/1940 | Doran | 416—213 |
| 2,448,825 | 9/1948 | Price et al. | 29—156.8 X |
| 2,579,583 | 12/1951 | Johnson | 29—156.8 |
| 3,319,536 | 5/1967 | Kohl et al. | 219—121 X |
| 3,436,515 | 4/1969 | Sayer et al. | 219—121 |
| 3,440,390 | 4/1969 | McCullough et al. | 219—121 |

FOREIGN PATENTS

| | | | |
|---|---|---|---|
| 127,627 | 6/1919 | Great Britain | 416—213 |
| 374,377 | 6/1932 | Great Britain | 416—213 |

OTHER REFERENCES

Welding Engineer, August 1962, Title: Better, Less Costly Bi-Metal Turbine Wheels EB Welded.

JOHN F. CAMPBELL, Primary Examiner

V. A. DI PALMA, Assistant Examiner

U.S. Cl. X.R.

219—121 EB; 416—213